$\lambda$ LIGHT SOURCE $\leq \lambda$ BAND GAP

INVENTORS
SEYMOUR P. KELLER
GABOR A. SOMORJAI

BY
ATTORNEY

United States Patent Office 3,386,823
Patented June 4, 1968

3,386,823
PHOTOTHERMIC IMAGE PRODUCING PROCESS
Seymour P. Keller, Chappaqua, and Gabor A. Somorjai, Montrose, N.Y., assignors to International Business Machines Corporation, New York, N.Y., a corporation of New York
Filed June 1, 1964, Ser. No. 371,553
9 Claims. (Cl. 96—27)

ABSTRACT OF THE DISCLOSURE

A photothermic image producing process comprising the steps of projecting a radiation image onto a layer of photothermically responsive material comprising a II–B—VI–A compound, concurrently subjecting said material to an elevated temperature for an extended period of time, and selecting the wavelength of said radiation forming said image to be less than or equal to the bandgap of said II–B—VI–A compounds.

---

The present invention relates to a method for producing photo-images on a film composed of a II–B—VI–A compound and to articles produced thereby. More particularly, it relates to such a method wherein a photo-image is projected onto the surface of the material concurrently with the application of heat, whereby a permanent image is formed upon said material.

Generally speaking, the field of photography is a highly developed one wherein certain silver salts such as silver iodides and silver bromides are utilized as the photosensitive elements of photographic films. As is well known, when such compounds are exposed to light and subsequently developed, they form the well known photographic negative utilized to print standard photographs. In addition, many other photo techniques have been developed for use in various industrial processes, such as photo-etches, wherein a photographic substance is deposited upon a sheet of material whose surface is to receive a desired etch pattern and an image of said pattern is focused upon said sheet and in accordance with the image so formed, an etching solution applied subsequentially to the material will selectively remove certain portions of the surface not protected by film exposed to said pattern. Such techniques are well known but suffer from the disadvantage in that they involve the preparation and use of complex chemical compounds in the photographic films and further, require fairly involved techniques and equipment to process the resultant films, prints and the like.

What has now been found is that when a light image is projected upon the surface of a film comprising a group of II–B—VI–A compound and said film is concurrently heated in an oxidizing atmosphere to cause oxidation of said film, that differential oxidation will occur in accordance with the light image, thus producing a permanent discernible image on said film. It has also been found that when such a process is continued for an extended length of time that the combined oxidation and erosion of said film in the illuminated area is sufficiently increased that it forms a depression with respect to the surrounding non-illuminated areas of a shape exactly conforming to the light image.

It is accordingly a primary object of the present invention to provide a novel photothermic process for the production of images upon a suitable substrate.

It is a further object to provide such a method wherein the substrate may be chosen from the group II–B—VI–A compounds.

It is yet another object to provide a photothermic etching technique.

It is a further object to provide photothermic elements comprising a layer of II–B—VI–A compound upon a suitable substrate.

The foregoing and other objects, features and advantages of the invention will be apparent from the following more particular description of preferred embodiments of the invention, as illustrated in the accompanying drawing.

Figure 1:
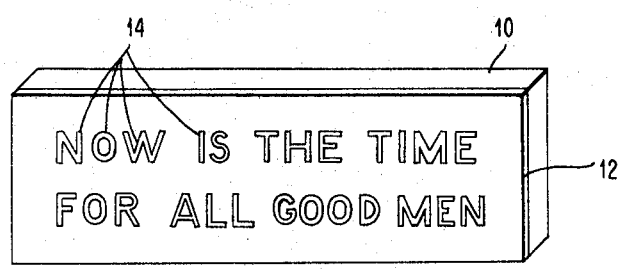
FIGURE 1 is a perspective view of a photothermic element having an image reproduced thereon.

The objects of the present invention are accomplished in general by projecting a light image onto a layer of photothermically responsive material comprising a II–B—VI–A compound and concurrently subjecting said layer to an elevated temperature for an extended period of time while concurrently maintaining said image thereon. It is also necessary that the wavelength of the impinging radiation be less than or equal to the band gap of the particular II–B—VI–A compound.

It has been known in the past that light of suitable wavelength and intensity has a marked effect on certain surface reactions such as adsorption, precipitation and dissociation which take place on certain semiconductor and insulator surfaces. The light sensitivity of these processes indicates that charge transfer is an important step in the over-all surface reaction. What has been found by the present invention is that in order to change the rate of charge transfer controlled surface reactions by light, the concentration of electrons or holes at the solid surface is greatly increased by illumination relative to their equilibrium value in the dark at the same reaction temperature. It has further been discovered that accompanying this greater surface activity in certain substances that a permanent photo-effect also occurs due to differences in oxidation rates in illuminated and non-illuminated areas.

Light has been found to change the oxidation rate of cadmium sulfide (CdS) single crystals. The oxidation of CdS under illumination in experiments further causes a composition change i.e., cadmium precipitates out at the surface as the second phase and causes a pronounced image effect in the illuminated as opposed to the non-illuminated areas.

While this effect was first noticed while working with cadmium sulfide films, it has been found that the same effect is achieved in a wide variety of II–B—VI–A compounds of which cadmium sulfide, cadmium telluride, cadmium selenide, zinc selenide, etc., are examples. Generally, any compound of group II–B which comprises Cd, Zn, Hg, and group VI–A which comprises S, Se, Te, exhibit the same phenomenon when concurrently heated and irradiated by light of a suitable wavelength. Further, the films may take the form of a single crystal or an amorphous film without any apparent effect on the results. In other words, the same photothermic effect is found when using wafers cut from a single crystal body or amorphous or polycrystalline films.

In a preferred embodiment of the invention consistently reproducible permanent images were formed on a cadmium sulfide wafer between 1 and 5 microns thick cut from a single crystal wherein the film was placed in a holder where it could be maintained at a temperature of approximately 300° C. and an optical image impinged thereon. A high pressure mercury lamp was used as a light source with a light output of approximately $10^5\mu$ watts/cm.$^2$ having a predominant output wavelength of 3550 A. By maintaining the elevated temperature of the film together with continuous illumination for periods of between 30 minutes to 3 hours, visual patterns have been formed on the cadmium sulfide film. The longer period of exposure producing an image of greater contrast.

As stated previously, the process may be advantageously carried out in a regular air atmosphere, an oxygen atmosphere slightly increases the rate of reaction. It has further been found that oxygen flow saturated with water vapor appears to materially enhance the reaction rate by an as yet unknown catalyst phenomenon.

As recited above, it is necessary that the energy of the impinging light be equal to or greater than the band gap energy for the particular II–B—VI–A compound being utilized as the active photothermic element. Stated alternatively, the wavelength of the impinging radiation must be equal to or less than the distance of said band gap of the II–B—VI–A material. This is true since it is well known that the energy of radiation is inversely proportional to the wavelength thereof. When the above wavelength or energy relationships are obtained, the impinging light radiation is absorbed rather than merely transmitted by the film. This is necessary for the desired differential surface activity to occur.

The temperature range within which the present process must be practiced is determined by the nature of the reaction. As nearly as this reaction can be determined, it is one of dissociation wherein the group II–B and group VI–A material are dissociated by the heat, whereby the group VI–A compound combines with a constituent of the surrounding medium, i.e., oxygen for the case of cadmium sulfide, and is carried out of the reaction zone, leaving the group II–B material therein. Therefore the minimum temperature for the reaction to occur is one where the formation of the image takes place, or stated differently, at which substantial dissociation occurs and a carrying away of the group VI–A compound. The higher temperature range is determined by the point at which substantial evaporation of the surface of the material begins to occur primarily by evaporation. At this stage, any image formed by the above mentioned process starts to be evaporated almost as quickly as it is formed. Therefore, at this point, the process temperature becomes inoperable. For the case of cadmium sulfide, the instant process is operable between the temperatures of approximately 300° and 450° C. To state the temperature range generally, the image will form in such a temperature interval where the rate of formation of the photographic image is greater than the rate of removal by oxidation or evaporation.

As stated previously, the primary reaction which is believed responsible for the formation of the image is one of dissociation, wherein the following formula represents the dissociation for CdS.

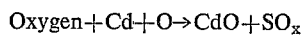

However, in the above reaction, it should be noted that the CdO reaction is not complete. In other words, an oxide film apparently forms on the surface of the cadmium particles and the center of the cadmium particles which are dark remain in the reaction zone to form the image. At the same time the SO$_x$ leaves the reaction zone and thus does not recombine with the cadmium thus establishing an equilibrium state wherein no image would be formed, i.e., cadmium precipitates. It may therefore be assumed that the present process may be carried out in any atmosphere which will combine with the group VI–A compound to remove said compound from the reaction area and yet not remove the group II–B compound other than to perhaps form a partial reaction on the surface thereof.

Having generally described the process for producing photothermic images according to the present invention, two examples of items made thereby will be described with reference to the accompanying figures.

FIGURE 1 is a perspective view of a simple photothermic element made in accordance with the present invention comprising a suitable substrate 10 having a layer of II–B—VI–A material deposited thereon. The letters 14 are merely representative of a typical permanent image formed in the layer 12. They are reproductions of the same letters located in a mask which was placed in front of the element during the photothermic recording process as will be more clearly described with reference to FIGURE 3. It will, of course, be understood that these letters are only representative of any desired design which could be made or worked into the mask. In other words, numbers, figures, special symbols, as well as various artistic designs could be used.

The present invention also has application in the electrical component industry wherein the insulating characteristics of the oxide layer formed in the illuminated area may be utilized to build up insulating layers on the surface of any insulating or conducting substrate. This characteristic may be used advantageously with any of the II–B—VI–A compounds mentioned.

Figure 2:
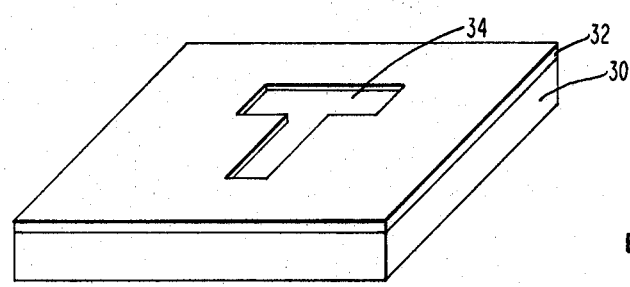
FIGURE 2 is a cross-sectional view illustrating a device having potential use in the printing industry made by the instant photothermic etching process.

FIGURE 2 is a perspective view of a further embodiment of the invention illustrative of a process whereby a shaped article may be formed by utilizing the present process for photo-etching. As in the previous figure, the element comprises a base or substrate 30 and an active photothermic layer 32 deposited thereon. The single shaped image 34, it will be noted, is depressed or etched into the surface of the layer 30. This is accomplished by continuing the present process for a longer time, i.e., up to 24 hours.

The instant photothermic etching process may be utilized to produce, for example, a master for making news print or artistic designs wherein the actual element as exemplified in FIGURE 3 would be utilized for casting print which would subsequently be used for the specific purpose of printing. Such a process would replace current methods of photo-etching, photo-engraving and the like. The primary advantage of the photothermic etching process of the present invention over that of the previously enumerated processes is its relative simplicity and the attendant reduction in cost. However, it would in all likelihood be a longer process although it is anticipated that certain additives in the II–B—VI–A photothermic layer will enhance the evaporation rate and thus decrease the time which would be required to achieve an etch of a given depth.

Figure 3:
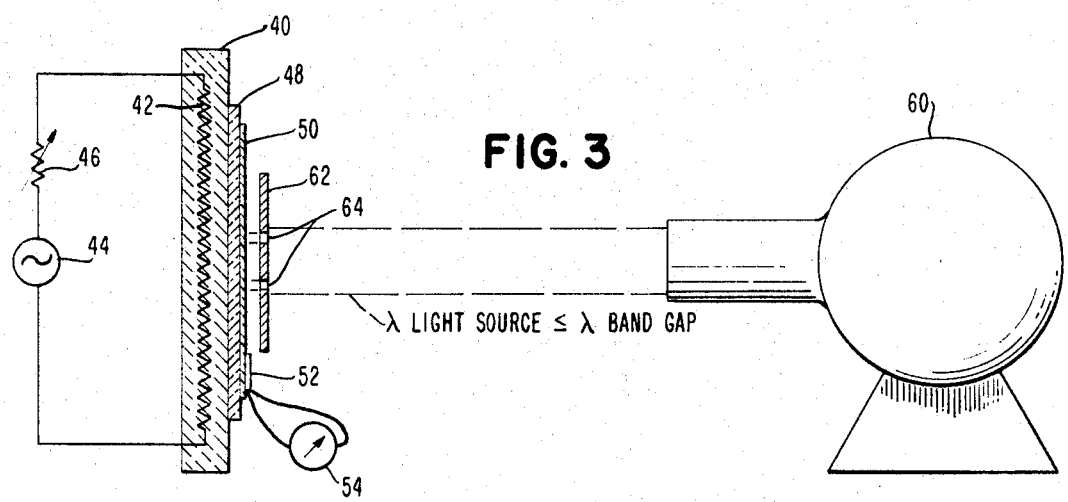
FIGURE 3 is a cross-sectional view of suitable apparatus for practicing the method of the present invention.

Referring now to FIGURE 3, there is shown a schematic illustration of a suitable apparatus which has been successfully used in practicing the present invention. A heating element or hot plate 40 is provided having suitable heating elements such as the resistance elements 42 located therein. A suitable source of electrical power 44 with a suitable current control potentiometer 46 is connected to the heating element and the temperature thereof may be adjusted by varying the potentiometer 46. The substrate 48 having the photothermic film 50 deposited thereon is suitably held on the surface of the hot plate 40. A thermocouple 52 is provided on the surface of the substrate and film to continually monitor the temperature thereof as by the meter 54 which may be suitably calibrated to temperature. Light source 60 serves the function of illuminating the film in the prearranged pattern illustrated as openings 64 formed in the mask 62 which is interposed between the light source 60 and the film itself 50. By placing the mask very close to the film, a clear image of the design on the mask is obtained. It will also be noted that the relationship between the wavelength of the impinging light from light source 60 and the length of the band gap of the photothermic material is set forth in the figure adjacent to the light beam for the purpose of emphasizing this important relationship.

The apparatus relationship illustrated in FIGURE 3 is also intended to be only exemplary of one form of apparatus which could be used in practicing the present invention. For example, the entire apparatus could be placed in a suitable container and a controlled atmosphere utilized wherein rigid control of water vapor content and/or oxygen may be attained. However, it should be noted that the apparatus illustrated in the drawing of the figure is a very accurate representation of the apparatus actually used in performing successful experiments in which visual images were made upon the previously mentioned cadmium sulfide films. Thus it may be seen that the apparatus required for practicing certain embodiments of the invention is indeed very simple and inexpensive.

In performing all of the experiments high pressure mercury or xenon lamps were used as light sources. A light intensity of $2.0 \times 10^5 \mu$ watts/cm.$^2$ was used. For wavelength dependent studies, a Bausch and Lomb grating monochromator or cut-off filters were employed.

Image formation according to the present invention is not limited to visible images. As mentioned previously insulating layers may be formed selectively by the present process on II–B—VI–A compounds.

A particular utility for such an insulating film would be, for example, on a field effect transistor made from a II–B—VI–A material such as CdS. In such a device it has previously been the practice to form the body of the device, apply the emitter and collector electrodes, at opposite ends, sputter on a silicon oxide insulating film and then apply the base or control electrode over said film. By means of the instant process it is no longer necessary to sputter on the insulating layer. It only requires illuminating the area to receive the insulating coating with light of a suitable wavelength and heating the device in an atmosphere containing oxygen to a temperature range wherein the rate of the II–B oxide formation is greater than the rate of erosion of the compound. It may thus be seen that the instant process has wide application in the electronic manufacturing industry and especially in the area of integrated circuits where very small and intricate circuit designs require novel manufacturing techniques.

The present method of forming an image in certain II–B—VI–A compounds by means of the instant photothermic process has wide application. The embodiments of the invention disclosed and described are intended to be only exemplary of various processes which can satisfactorily utilize the advantages of the invention, however, it is to be understood that it is not intended that the invention in any way be limited by the suggested uses therefor.

Substrate materials suitable for use in any of the embodiments of FIGURE 1 or 2 may be chosen from a wide group; the main criteria being that they be capable of withstanding the heat of the process. For example, glass or metal would be suitable substrates. Also, flexible substrates may be used such as a number of the known rubbers and fluorinated hydrocarbon polymers which are again capable of withstanding the elevated temperatures.

It will further be remembered that while the disclosed II–B—VI–A compound form the significant active material for the device, it is anticipated that a number of additives may be utilized in the nature of sensitizers to enhance the desired effect to be obtained by various disclosed species of the invention such as increasing the oxidation rate in the illuminated areas for the embodiment of FIGURE 2 or increasing the contrast of the resultant image for the embodiment of FIGURE 1.

While the invention has been particularly shown and described with reference to preferred embodiments thereof, it will be understood by those skilled in the art that various changes in form and details may be made therein without departing from the spirit and scope of the invention.

What is claimed is:

1. A photothermic image producing process which comprises:
    projecting a light image of a desired shape upon the surface of a layer of material comprising a group II–B–VI–A compound of the periodic table;
    concurrently heating said element while said light image is projected thereon to a point at which dissociation of the compound takes place and the group VI–A element reacts with an element of the surrounding media and is carried out of the reaction zone and the group II–B element precipitates in the reaction area;
    said light being of a wavelength ($\lambda$) which is equal to or less than the band gap of said II–B—VI–A compound.

2. A method as set forth in claim 1 wherein said material comprises:
    cadmium sulfide; and
    wherein the temperature range of the heating is between about 300° C. and 450° C.

3. A method as set forth in claim 1 above wherein said material comprises cadmium selenide.

4. A method as set forth in claim 1 above wherein said material comprises cadmium telluride.

5. A photothermic etching process which comprises:
    projecting a light image onto a layer of material comprising a group II–B—VI–A compound of the periodic table, the wavelength ($\lambda$) of said light being equal to or less than the band gap of said material; and
    concurrently heating said compound in an atmosphere containing oxygen for an extended period of time while said image is projected thereon, whereby selective erosion of said surface occurs in accordance with the areas subjected to said image.

6. A photothermic image producing process which comprises:
    projecting a light image upon a layer of cadmium sulfide, the light having a wavelength equal to or less than the band gap of the cadmium sulfide;
    introducing oxygen and water vapor into the environment of said layer;
    concurrently heating said element while said light image is projected thereon to a point wherein the rate of formation of an image due to cadmium being precipitated in the illuminated area is greater than the rate at which the image erodes due to oxidation and evaporation.

7. A method for forming an insulating layer which comprises:
    projecting a light image on a layer of a material comprising a group II–B—VI–A compound of the periodic table;
    concurrently heating said layer in an atmosphere containing oxygen to the range where the rate of oxide formation of the II–B element exceeds the rate of erosion thereof.

8. A method for forming an electrical component from a body of material comprising a group of II–B—VI–A compound of the periodic table, which comprises:
    forming a desired component within the body of the material;
    projecting a light image on the surface of this body over which it is desired to form an insulating layer, said light being of a wavelength equal to or less than the bandgap of said compound; and concurrently heating said body in an atmosphere containing oxygen to a temperature range wherein the rate of formation of the II–B oxide in said surface is greater than the rate of erosion thereof.

9. A method for forming an electrical component as set forth in claim 8 wherein said II–B—VI–A compound is cadmium sulfide.

References Cited

UNITED STATES PATENTS 3,223,525  12/1965  H. Jonker et al. ____ 96—36.2 X

OTHER REFERENCES

Markham, M. C.: The Photochemical Oxidation of Zinc and Cadmium Sulfide, in Journal Physical Chemistry 61, pp. 1665–68, December 1957.

Calvert, P. G.: Study of the Mechanism of Endothermic Reactions Photosensitized on Solid Surfaces. In U.S. Dept. Commerce Technical P.B. Report 149, 260, pp. 1–20 December 1959.

NORMAN G. TORCHIN, *Primary Examiner.*

R. E. FICHTER, *Assistant Examiner.*